(No Model.)
I. E. CLIFFORD.
SHAFT FOR SCREW PROPELLERS.
No. 373,339. Patented Nov. 15, 1887.
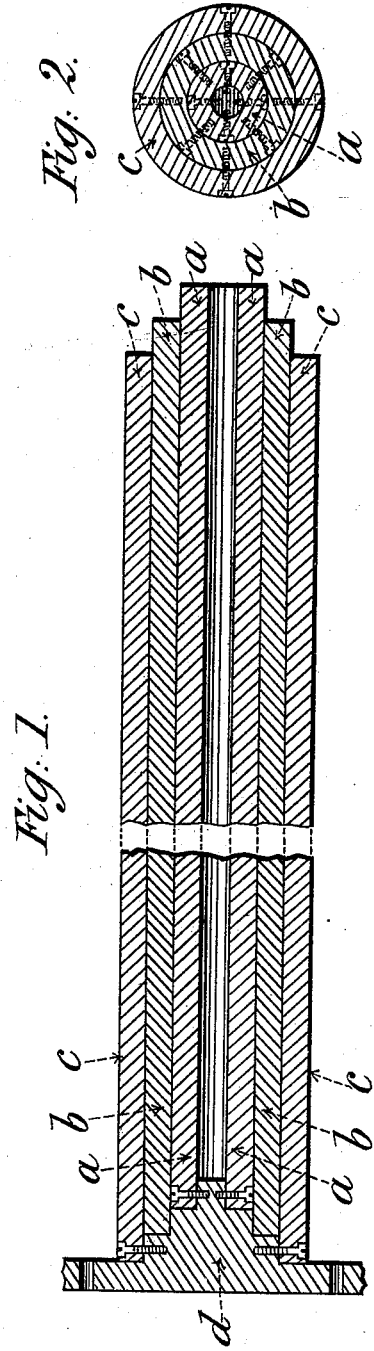

UNITED STATES PATENT OFFICE.

ISIDORE ESKELL CLIFFORD, OF LONDON, COUNTY OF MIDDLESEX, ENGLAND.

SHAFT FOR SCREW-PROPELLERS.

SPECIFICATION forming part of Letters Patent No. 373,339, dated November 15, 1887.

Application filed September 5, 1887. Serial No. 248,879. (No model.)

*To all whom it may concern:*

Be it known that I, ISIDORE ESKELL CLIFFORD, a subject of the Queen of Great Britain and Ireland, residing at London, in the county of Middlesex, England, have invented a new and useful Improved Construction of Shaft for Screw-Propellers and other Purposes, of which the following is a specification.

My invention relates to an improved construction of shaft for screw-propellers and other purposes; and it has for its object to construct the shaft in such a manner that great strength is obtained for the same, the chance of fracture is avoided, and the possibility of quickly repairing a shaft, whether employed for a screw-propeller or for other purpose, is provided for.

In the shafts now constructed for, say, screw-propellers it is impossible to ascertain whether any flaw exists in the same, notwithstanding that the greatest care is taken in their manufacture, and in case of fracture much time is lost in repairing the shaft or in substituting a new one. In some cases this is even impossible until the vessel arrives in port. I obviate all these inconveniences by means of my improved but simple construction of shaft as about to be described with reference to the accompanying drawings, in which—

Figure 1 is a longitudinal section, and Fig. 2 a transverse section, of a screw-propeller shaft constructed according to my invention.

In carrying out my invention the shaft, instead of being constructed, as heretofore, in one solid piece or forging, or in more than one piece flanged and bolted together, is constructed of a suitable number of tubes or tubular pieces fitted one within or over the other, but not welded together, as this would be liable to form a solid mass or body, which would defeat the purposes of my invention.

In the figures shown in the drawings the shaft is constructed or built up of, say, three tubes, *a b c*. All these tubes are, by preference, of the same thickness throughout, and are retained in place by being forced one into or over the other, although, by preference, they do not terminate in the same vertical line with one another. At one end they are secured to a stepped plug, forming a plate, *d*, which is connected with the engine, and on the other end the screw-propeller is mounted in any suitable manner. The innermost tube, *a*, is first fitted on, and is then retained in place on the innermost step of the plate by screw-bolts. Then the second tube, *b*, is fitted on and retained in like manner, and finally the third tube, *c;* or these tubes may be secured for attachment to the engine in any other suitable manner. A shaft so constructed will be found to possess greater strength than one made in a solid piece or in solid pieces. Now, in case of injury arising to any one or more of these tubes, the propeller will still be able to be worked with the remaining tubes, or it will only be necessary to withdraw said injured tube or tubes and to substitute a sound one or sound ones therefor, a spare number of which can always be carried on board the vessel.

Although I have described and shown my invention as applied to a screw-propeller shaft, it may be applied to the shafting of machinery generally.

Having now described my invention and in what manner the same may be carried into effect, I claim and desire to secure by Letters Patent—

A shaft for screw-propellers and other machinery, consisting of a suitable number of tubes fitted or built up one within or over the other, substantially as herein described.

In witness whereof I have hereunto signed my name in the presence of two subscribing witnesses.

ISIDORE ESKELL CLIFFORD.

Witnesses:
WILLIAM LEE,
    68 *Fleet Street, London.*
WALTER J. SKERTEN,
    17 *Gracechurch Street, London, E. C.*